United States Patent

[11] 3,564,262

| [72] | Inventor | Clifford C. Hach |
| | | Ames, Iowa |
| [21] | Appl. No. | 703,613 |
| [22] | Filed | Feb. 7, 1968 |
| [45] | Patented | Feb. 16, 1971 |
| [73] | Assignee | Hach Chemical Company |

[54] TURBIDIMETER USING A PRESSURIZED FLUID CONTAINER
1 Claim, 1 Drawing Fig.

[52] U.S. Cl............................................. 250/218;
356/103, 356/135, 356/208, 356/246
[51] Int. Cl............................................. G01n21/00,
G01n 21/46, G01n 1/00
[50] Field of Search............................................. 356/102,
103, 104, 207, 208, 133—137; 250/218

[56] References Cited
UNITED STATES PATENTS
1,937,721  12/1933  Simon et al.................. 356/207

| 2,387,581 | 10/1945 | Hansen........................ | 356/136 |
| 2,732,753 | 1/1956 | O'Konski..................... | 356/103-X |
| 2,807,976 | 10/1957 | Vossberg...................... | 356/136 |
| 2,866,379 | 12/1958 | Veit.............................. | 356/208-X |
| 3,045,123 | 7/1962 | Frommer..................... | 356/103-X |
| 3,309,956 | 3/1967 | Hach............................ | 356/103 |
| 3,364,812 | 1/1968 | Ewing.......................... | 356/103 |

*Primary Examiner*—Ronald L. Wibert
*Assistant Examiner*—Warren A. Sklar
*Attorney*—Wolfe, Hubbard, Voit & Osann

ABSTRACT: A turbidimeter for fluid under pressure consisting of a pipe section having a thick optical glass window through which light is refracted into the liquid at a very shallow angle. A photocell is positioned to sense light reflected by turbidity particles in the fluid.

PATENTED FEB 16 1971
3,564,262
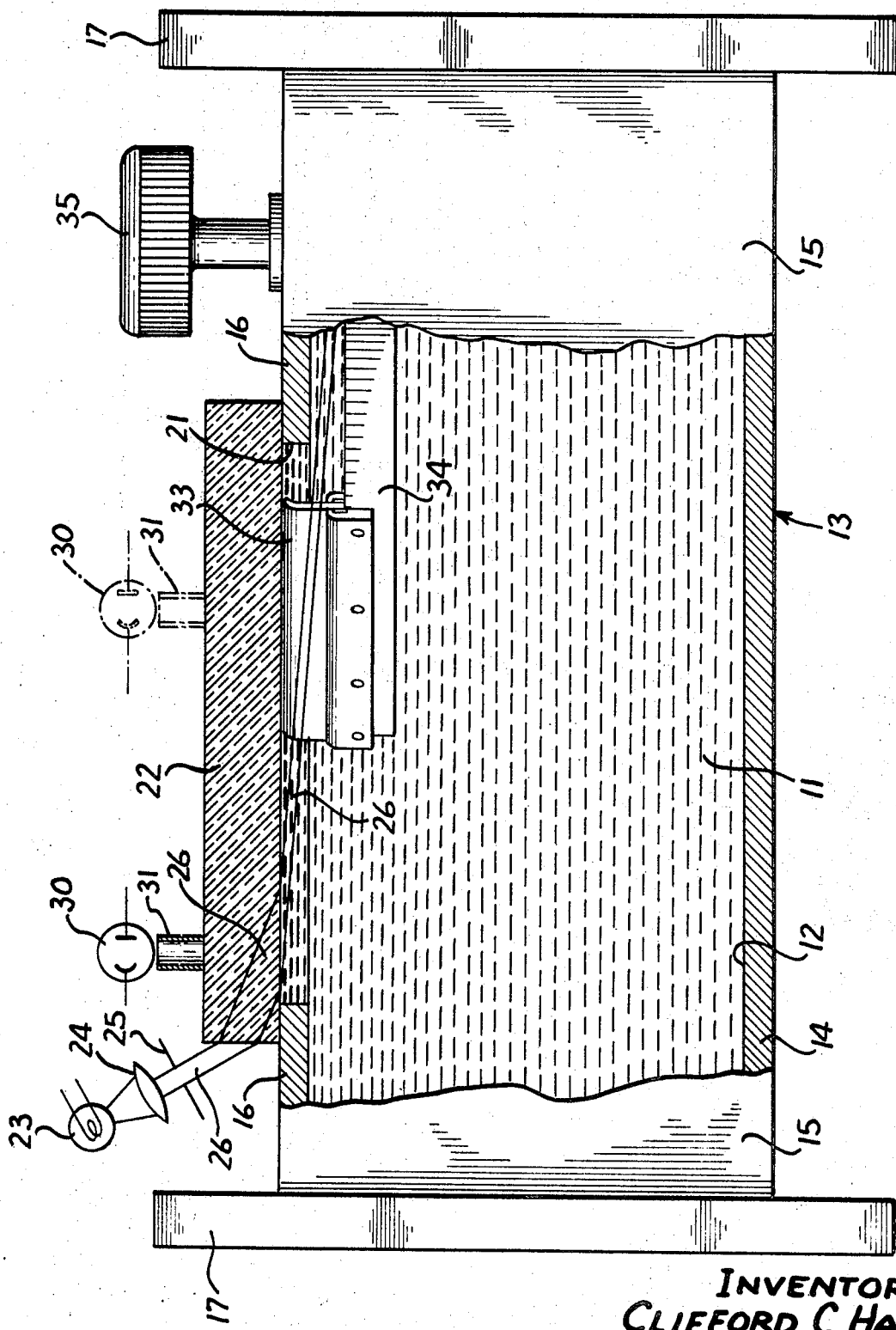
INVENTOR
CLIFFORD C. HACH
by: Wolfe, Hubbard, Voit & Osann
ATTYS.

TURBIDIMETER USING A PRESSURIZED FLUID CONTAINER

DESCRIPTION OF THE INVENTION

This invention relates to turbidimeters and more particularly concerns a novel turbidimeter for sensing turbidity in fluid under pressure.

Most turbidimeters sense turbidity by passing light through the fluid under investigation so that there is an appreciable path in the fluid along which light must travel before it reaches the sensing photocell. Such instruments are subject to inherent deficiencies. For one thing, color in the fluid absorbs light as the light travels along its path through the fluid and hence color variations change the amount of absorption and produce false turbidity readings. Also, such meters which measure light reflected from turbidity particles go "blind" at high turbidity levels. Increasing turbidity causes more light to be reflected toward the photocell, but the increasing turbidity also begins to block light from the photocell and a point is reached where increasing turbidity causes a lowering of the photocell signal.

A turbidimeter which will not go blind and which is insensitive to color changes is shown in my U.S. Pat. No. 3,309,956, issued Mar. 21, 1967. However, this instrument depends upon an open liquid surface, and normally it is used by draining off and discharging a continuous sample of the fluid being investigated. It will be readily apparent that many situations make it impossible, or at least undesirable, to expose a fluid whose turbidity is being checked to the atmosphere or to waste even a small sample stream of the fluid.

Accordingly, it is the primary aim of the invention to provide a turbidimeter which is unaffected by color or very high turbidities but can accurately measure enclosed fluids, even under pressure, without drawing off a sample stream.

Another object of the invention is to provide a turbidimeter of the above type which will readily function to give continuous turbidity readings of a flowing stream of fluid.

A further object is to provide a turbidimeter as characterized above having very little "window" effect error, i.e., difference between a true turbidity reading and a reading affected by light absorption or misdirection caused by the glass, and accumulations on the glass, through which the light must pass to reach the photocell from the fluid being investigated.

Other objects and advantages of the invention will become apparent upon reading the following detailed description and upon reference to the drawing, which is a somewhat schematic, partially sectioned, side elevation of a turbidimeter embodying the invention.

While the invention will be described in connection with a preferred embodiment, it will be understood that I do not intend to limit the invention to that embodiment. On the contrary, I intend to cover all alternatives, modifications and equivalents as may be included within the spirit and scope of the invention as defined by the appended claims.

Turning now to the drawing, there is shown, somewhat schematically, a turbidimeter 10 embodying the invention and adapted to measure the turbidity of a fluid 11. The turbidimeter includes a chamber 12 preferably defined by a section of square pipe 13 having thick, pressure resisting walls 14, 15 and 16, and end flanges 17 adapting the instrument for being coupled in a conduit carrying the fluid 11. It is contemplated that the pipe 13 have sufficient strength to enable fluid under considerable pressure to safely pass through the turbidimeter 10.

The wall 16 is formed with an elongated opening 21 over which is sealed a thick transparent block 22 capable of maintaining the structural integrity of the pipe 13. In the preferred form, the block 22 is rectangular, about three-fourths of an inch thick, and is formed of polished optical glass.

Light from a lamp 23 is introduced into the fluid 11 by a lens 24 and a shutter 25 that create a light beam 26 directed into an edge surface of the block 22. The angle of the entering beam is such that the beam 26 is refracted from the inner surface of the block 22 through the opening 21 at a small angle from the plane of the block. Desirably, the angle of the beam 26 entering the fluid is about 5° or less from the flat inner surface of the block 22.

A light sensing photocell 30 is positioned above the block 22 to receive light reflected by turbidity particles illuminated in the fluid by the beam 26. A tube 31 confines the view of the photocell to a direction at right angles with respect to the block 22 so that the photocell sees the region of fluid directly opposite the block from the tube 31. Although not shown, it will be obvious that the photocell 30 and the block 22 are enclosed against ambient light and that the photocell 30 is also shielded from the lamp 23. The output signal from the photocell 30 can be utilized in any way desired, and various kinds of meters, alarms and continuous recorders for this purpose are well known to the art.

In the preferred embodiment, a wiper blade 33 is mounted on an arm 34 within the chamber 12, and the arm 34 is pivoted and connected to a knob 35 outside of the pipe 13 so that manually turning the knob 35 causes the blade 33 to sweep the inner surface of the block clear of accumulated foreign matter such as might be deposited by a turbid fluid. The manual knob 35 can readily be replaced by a motor drive, which would be particularly desirable when the instrument is used for continuous recording.

For normal, wide-range turbidity readings, the photocell 30 is positioned as shown in solid lines. In this way, turbidity in the fluid immediately adjacent the block-fluid interface is sensed. The extremely short, or even nonexistent, path the light must follow in the liquid before it read reaches the photocell makes the instrument virtually insensitive to color changes and prevents it from going blind at extremely high turbidities. Slight scratches or other imperfections on the inner surface of the block directly in the view of the photocell could cause some light to be reflected to the cell that is not related to turbidity in the fluid 11, but this potential for error is a very minor factor, particularly at medium and high turbidities.

When extremely low turbidities are to be sensed, such as might be present in distilled turbine boiler water, the photocell 30 and the tube 31 are moved to the alternate positions shown in dashed lines. Here the photocell 30 is directly over the beam 26 but is viewing a portion of the fluid illuminated by the beam which is slightly spaced from the inner surface of the block 22. This virtually eliminates the "window" effect, i.e., light being scattered by slight imperfections on the inner surface of the block. This is so since, with the photocell located in the dashed line position, the scattering caused by the block surface represents only a small percent loss of the already small amount of light being reflected to the photocell. With polished optical glass, this loss is so slight as to be insignificant. In the solid line position of the photocell 30, the photocell would see the same solid small percentage of scattered light, but here the much stronger light beam 26 itself would be scattered and while such scattering reflections are slight, they are more significant at extremely low turbidity ranges.

It can thus be seen that the turbidimeter 10 is an instrument which is virtually unaffected by color changes in the fluid under investigation and which will not go blind at high turbidity ranges. These advantages are obtained in an instrument capable of measuring fluids under pressure which does not require a sample stream to be drawn from the fluid for turbidity measuring. The pipelike configuration of the turbidimeter 10 permits it to be readily installed wherever fluids are being circulated. Those familiar with the art will appreciate that the turbidimeter 10 is well suited for economical manufacture, and ease in installation and maintenance.

I claim:

1. A turbidimeter comprising, in combination, a chamber for receiving and containing fluid, said chamber having a wall with an elongated opening therein, a thick transparent block sealed over said opening, a light source for directing a beam of light into an edge of said block so that the beam is refracted into the fluid through said opening at a small angle from from the plane of the block, and a light sensing cell positioned above said block to receive light reflected by turbidity particles illuminated in the fluid by said beam, said light sensing cell being adjustable from a position to receive reflected light coming from the region immediately adjacent the block-fluid interface so that high turbidities can be measured with no tendency for the instrument to go blind to a position to receive reflected light coming from a region where said beam is spaced from said block so that low turbidities can be measured with no reflection to the cell from portions of the block illuminated by said beam.